US006740686B1

(12) United States Patent
Ghesquiere et al.

(10) Patent No.: US 6,740,686 B1
(45) Date of Patent: May 25, 2004

(54) PROCESS FOR THE MANUFACTURE OF POLYURETHANE FOAM, AMINE POLYESTERPOLYOL USED IN THIS PROCESS AND FOAM OBTAINED

(75) Inventors: Denis Ghesquiere, Tourville la Campagne (FR); Remy Dumont, Thuit Signol (FR)

(73) Assignee: Crompton Corporation, Middlebury, CT (US)

( * ) Notice: Subject to any disclaimer, the term of this patent is extended or adjusted under 35 U.S.C. 154(b) by 265 days.

(21) Appl. No.: 09/723,034

(22) Filed: Nov. 27, 2000

(51) Int. Cl.$^7$ ................................................ C08G 18/28
(52) U.S. Cl. ............ 521/129; 252/182.26; 252/182.27; 252/182.28; 560/79; 560/93; 568/583; 568/606; 568/619; 568/623; 521/163; 521/164; 521/167; 521/172; 521/173
(58) Field of Search ................................. 521/129, 163, 521/164, 167, 172, 173; 252/182.26, 182.27, 182.28; 568/583, 606, 619, 623; 560/79, 93

(56) References Cited

U.S. PATENT DOCUMENTS 5,545,675 A * 8/1996 Loy et al. .................... 521/172
5,834,579 A * 11/1998 Konig et al. .................... 528/53
6,156,814 A * 12/2000 Chen et al. .................. 521/129
6,461,536 B2 * 10/2002 Wilson et al. ........... 252/182.2

* cited by examiner

Primary Examiner—John M. Cooney, Jr.
(74) Attorney, Agent, or Firm—Michael P. Dilworth

(57) ABSTRACT

The invention concerns a method for making a polyurethane foam by reacting at least a polyester polyol with at least a polyisocyanate in the presence of a foaming agent and a catalytic agent, such a polyester polyol having been previously obtained by reacting a reactive acid A comprising at least an aliphatic or aromatic polyacid with functionality not less than 2 with at least a polyol P2 with functionality equal to 2 and at least an aliphatic or aromatic polyacid with functionality not less than 2 with at least a polyol P2 with functionality equal to 2 and at least a polyol P3 with functionality not less than 3, being thereafter called AP2P3, wherein the catalytic agent at least partly consists of at least one amine polyester polyol AP2P3, wherein at least part of polyol P3 consists of at least a polyoxyalkylene polyalkanolamine having at least a tertiary amine function, the alkanol radicals of said polyalkanolamine being C1–C6, the alkylene oxide units being C2–C4 and the statistical mean of the number N of alkylene oxide units per polyoxyalkylene polyalkanolamine being equal to f×X, f being the number of hydroxyl functions per polyalkanolamine molecule and X being a number ranging between 1 and 10, inclusively.

30 Claims, No Drawings

PROCESS FOR THE MANUFACTURE OF POLYURETHANE FOAM, AMINE POLYESTERPOLYOL USED IN THIS PROCESS AND FOAM OBTAINED

The present invention relates to a process for the manufacture of a polyurethane foam by reaction of a polyol with a polyisocyanate, in which process a tertiary amine is used as catalyst and in which process an expansion agent or foaming agent, such as water, for example, is used.

It is well known to use one or more tertiary amines to catalyze a first reaction: that of at least one polyol with at least one polyisocyanate. Furthermore, in the case where water is used as foaming agent, the tertiary amine(s) is (are) capable of catalyzing a second reaction: that of water with the free isocyanate functional groups, which reaction results in the evolution of carbon dioxide gas which serves for the expansion of the foam. Several known techniques exist for the preparation of polyurethanes. According to a first technique, at least one polyetherpolyol and/or at least one polyesterpolyol is reacted with at least one polyisocyanate, so as to obtain a prepolymer comprising free isocyanate groups, and then the prepolymer obtained is reacted with an additional amount of polyol(s). Another well known technique is the so-called "one shot" technique, where all the ingredients are introduced, separately or selectively premixed according to their compatibility, into the mixing head.

The known tertiary amines can promote the first reaction and/or the second reaction to variable extents. When one of the reactions is not catalyzed or is insufficiently catalyzed, it is then necessary to use another catalyst for the other reaction. This other catalyst can be an organometallic derivative, such as stannous octoate or dibutyltin dilaurate, known for preferentially catalyzing the isocyanate polyol reaction. The use is therefore being attempted of tertiary amines which satisfactorily catalyze both reactions. It is known to use tertiary amines, such as N-ethylmorpholine, dimethylbenzylamine, triethylene-diamine and hexadecyldimethylamine, these tertiary amines being introduced as such into the reaction mixture.

However, these tertiary amines have a disadvantage: they are volatile, have a very unpleasant amine smell and are often toxic. As most of the tertiary amine(s) remains in the foam in the free state, the foam prepared has an undesirable smell and gives off toxic vapors. Furthermore, the handling of tertiary amines during the manufacture of polyurethane foam demands specific precautions in order to meet safety standards.

In order to overcome the above disadvantages, the use has been proposed (paper by Savoca, Franson and Louie, UTECH'92 Conference Proceedings, p. 309–315 and U.S. Pat. No. 4,433,170) of less volatile amines with a high molecular weight, however, the ratio by weight of the tertiary amine functional group with respect to the weight of the molecule becomes low and the reactivity of the catalyst decreases. Furthermore, these amines are more expensive, they often still have an unpleasant smell and they often have a reactivity which is too different from that of standard amines, which is not very acceptable to foam producers.

Furthermore, it has also been proposed (paper by Diblitz and Hoell, UTECH'92 Conference Proceedings, p. 80–85) to attach the tertiary amine catalyst to free isocyanate functional groups. To this end, a tertiary amine, for example a hydroxylated tertiary amine, which reacts with the isocyanate functional groups during the preparation of the polyurethane is added to the reaction mixture. However, in this case, it is still necessary to handle polluting amines at the stage of preparation of the foam and precautions are still necessary to meet safety standards.

The preparation of a polyurethane by reaction of at least one polyesterpolyol with at least one polyisocyanate is well known. This polyesterpolyol is conventionally prepared by reaction of an acid reactant having a functionality at least equal to 2, such as adipic acid, with at least one polyol with a functionality equal to 2, such as diethylene glycol, subsequently denoted by P2, and at least one polyol with a functionality at least equal to 3, such as trimethylolpropane, glycerol or pentaerythritol, subsequently denoted by P3. FR-A-2 747 389 discloses the manufacture of specific polyesterpolyols, capable of being used in the manufacture of polyurethane foams, which do not exhibit fogging when they are used in the passenger compartment of a vehicle. According to this patent, the polyol P2 comprises monoethylene glycol and optionally a branched glycol with a functionality equal to 2 and the polyol P3 is a polyoxyalkylenated polyol which is, inter alia, obtained from triethanolamine or from triisopropanolamine. In the preparation of the polyurethane foams disclosed in FR-A-2 747 389, a separate tertiary amine catalyst, dibutylbenzylamine according to the examples, is still added.

According to the present invention, it has been found that, when the polyesterpolyol is prepared from at least one polyol P3 which is a polyoxyalkylenated polyol obtained by oxyalkylenation of a tertiary polyalkanolamine and when it is thus "amine", it is no longer essential, during the manufacture of the polyurethane foam, to separately add a tertiary amine as catalyst or, that to say the least, the amount of separate tertiary amine to be added is markedly reduced. This is because it has been found that the amine polyesterpolyol defined above has an autocatalytic effect, that is to say that it has both a reactive role and a catalyst role.

Throughout the text of the present patent application, the term "polyalkanolamine" has generically denoted an alkanolated amine which can be either a polyalkanolmonoamine or a polyalkanolpolyamine.

In a first embodiment, the tertiary polyalkanolamine is a polyamine, at least one amine group and preferably all the amine groups of which is (are) tertiary and is (are) substituted by identical or different $C_1$–$C_6$ alkanol radicals.

In a second embodiment, the tertiary polyalkanolamine is a tertiary monoamine substituted by identical or different $C_1$–$C_6$ alkanol radicals.

Generally, according to the present invention, it has been found that an amine polyesterpolyol in which is inserted at least one such polyoxyalkylenated polyalkanolamine had, by itself, a catalytic effect for the formation of polyurethane foams. It acts mainly on the foaming reaction in the presence of water and to a certain extent on the reaction of the polyol with an isocyanate, known as gelling. Consequently, it is possible not to use any other amine catalyst, only a small amount of catalyst of the organometallic type optionally being able to be added in order to accelerate the gelling reaction and to obtain a foam which does not collapse.

According to the invention, the tertiary amine is introduced during the polyesterification process into at least one polyesterpolyol used for the manufacture of the polyurethane: it is thus included or inserted in the said polyesterpolyol; the result of this is that:

the risks of evolution of tertiary amine during the manufacture of the polyurethane are avoided and, consequently, there is neither a problem of odor nor a problem of toxicity on the foam production site; problems of pollution during the production of the foam are thus avoided and certain specific precautions for meeting safety standards do not have to be taken;

foams are obtained which do not have an amine smell and are less toxic. In particular, a source of fogging when the foam is used in the passenger compartment of a motor vehicle is thus avoided and, furthermore, when polyesterpolyols, such as those disclosed in FR-A-2 747 389, not comprising volatile cyclic dimers are employed, the foam does not result in any fogging.

The subject matter of the present invention is consequently a process for the manufacture of a polyurethane foam by reaction of at least one polyesterpolyol and of at least one polyisocyanate in the presence of a foaming agent and of a catalyzing agent, such a polyesterpolyol having been obtained beforehand by reaction of an acid reactant A, comprising at least one aliphatic or aromatic polyacid with a functionality at least equal to 2, with at least one polyol P2 with a functionality equal to 2 and at least one polyol P3 with a functionality at least equal to 3 and subsequently being denoted by AP2P3, characterized in that the catalyzing agent is at least partially composed of at least one amine polyesterpolyol AP2P3, in which at least a portion of the polyol P3 is composed of at least one polyoxyalkylenated polyalkanolamine having at least one tertiary amine functional group, the alkanol radicals of the said polyalkanolamine being $C_1$–$C_6$ radicals, the alkylene oxide units being $C_2$–$C_4$ units and the statistical mean of the number N of alkylene oxide units per polyoxyalkylated polyalkanolamine molecule being equal to f×x, f being the number of hydroxyl functional groups per polyalkanolamine molecule and x being a number between 1 and 10 inclusive, preferably between 2 and 5.

The foaming agent is preferably water.

According to the invention, preferably no amine catalyst other than the amine polyesterpolyol AP2P3 is used. However, it can be advantageous to also add a nonamine catalyst of organometallic type, such as stannous octoate or dibutyltin dilaurate, in order to accelerate the gelling reaction of the isocyanate with the polyol and thus to obtain a more stable foam.

The polyalkanolamine can advantageously be a polyamine, all the amine functional groups of which are tertiary; however, in a particularly preferred way, the polyalkanolamine is a tertiary monoamine.

Preferably, the alkanol radicals of the polyalkanolamine(s) are $C_2$–$C_3$ radicals and the alkylene oxide units are taken from the group formed by ethylene oxide, propylene oxide and their mixtures, x being any number between 2 and 5 inclusive.

In the amine polyesterpolyol AP2P3, the molar ratio of the polyoxyalkylenated polyalkanolamine(s) to all the other polyols used for the reaction with the acid reactant A is preferably between 1/99 and 50/50, with greater preference between 3/97 and 10/90 (proportions in moles).

The polyol P2 comprises at least one glycol chosen from the group formed by monoethylene glycol, diethylene glycol and polyethylene glycols with an order greater than 2; it can also comprise at least one branched glycol of formula:

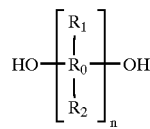

in which formula:
$R_0$ represents, independently in each $[R_1R_0R_2]$ unit, a carbon atom, a $C_6$ alicyclic radical, a phenyl radical or a heterocyclic radical comprising 4 to 6 atoms which is saturated or unsaturated, the heteroatom being O or N;

$R_1$ and $R_2$ represent, independently in each $[R_1R_0R_2]$ unit and independently of one another, a hydrogen atom, a linear $C_1$–$C_6$ alkyl radical, a branched $C_3$–$C_6$ radical, a $C_6$ alicyclic radical or an aryl radical;

with the proviso that, if $R_0$ is not a ring in any of the $[R_1R_0R_2]$ units, $R_1$ and/or $R_2$ is (are) different from H in at least one of the $[R_1R_0R_2]$ units;

n is an integer between 1 and 8 (inclusive), with the proviso that, if n is greater than or equal to 4, the number of the carbon atoms in the combined $R_0$, $R_1$ and $R_2$ radicals is greater than 8 in total.

Advantageously, tile polyol P3 is composed entirely of one or more polyoxyalkylenated polyalkanolamine(s); however, it can also comprise at least one polyoxyalkylenated polyalkanol obtained by oxyalkylenation form a hydroxylated component, such as trimethylolethane, trimethylolpropane, ditrimethylol-propane, pentaerythritol, dipentaerythritol, glycerol, hexane-1,2,6-triol, butane-1,2,4-triol, sorbitol, tris(2-hydroxyethyl) isocyanurate or their mixtures, the number of alkylene oxide units per hydroxyl functional group of the polyalkanol preferably being, as a statistical mean, between 1 and 10 inclusive. The polyol P3 can also comprise non-oxyalkylenated alkanols, such as trimethylolethane, trimethylol-propane, ditrimethylolpropane, pentaerythritol, dipentaerythritol, glycerol, hexane-1,2,6-triol, butane-1,2,4-triol, sorbitol, tris (2-hydroxyethyl) isocyanurate and their mixtures.

The acid reactant A comprises at least one aliphatic or aromatic diacid preferably taken from the group formed by adipic acid and phthalic anhydride; it can also comprise at least one branched acid having a functionality greater than or equal to 2, which branched acid is preferably a dimer of an unsaturated $C_{17}$–$C_{24}$ fatty acid. Use is advantageously made of a $C_{18}$ fatty acid mono-, di- and trimer mixture comprising at least 70% by weight of dimer.

For the preparation of the amine polyesterpolyol AP2P3, the acid reactant A is conventionally reacted with a total amount of polyols P2 and P3 greater than stoichiometry, so as to obtain an amine polyesterpolyol AP2P3 comprising at least two free hydroxyl groups per molecule. The reaction is generally carried out under an inert atmosphere, at a temperature of between 160 and 250° C., in the presence of an appropriate metallic or organometallic catalyst.

The polyurethane foam is prepared by reaction of at least one polyesterpolyol and of at least one polyisocyanate by any known process, in particular by the so-called "one shot" process. The processes for the manufacture of polyurethanes are described in J. H. Saunders, K. C. Frisch, High Polymers, 1964, Vol. 26, entitled "Polyurethanes Chemistry and Technology", published by "Interscience Publishers", or in G. Woods, 1982, "Flexible Polyurethane Foams: Chemistry and Technology", published by "Applied Science Publishers".

Other additives can also be introduced in a known way into the reaction mixture, such as surfactants, polyols with a low molecular weight of less than or equal to 400 as chain extenders, foam-stabilizing agents, flame-retardant agents, pigments, dyes, fillers, stabilizers against aging or substances having a fungistatic or bacterioszatic effect.

The polyisocyanate used can conventionally be at least one aromatic, aliphatic or heterocyclic polyisocyanate. Use is generally made of polyisocyanates or mixtures of polyisocyanates which are readily available commercially, such as 2,4- and 2,6-toluylene diisocyanate (TDI) and their mixtures, diphenylmethane diisocyanates (MDI) or prepolymers resulting from the partial reaction of a polyisocyanate with a hydroxylated compound.

Another subject matter of the invention is an amine polyesterpolyol AP2P3 capable of being used in the process defined above, the said polyesterpolyol being obtained by reaction of an acid reactant A, comprising at least one aliphatic or aromatic polyacid with a functionality at least equal to 2, with at least one polyol P2 with a functionality equal to 2 and at least one polyol P3 with a functionality at least equal to 3, a least a portion of the polyol P3 being composed of:

at least one polyoxyalkylenated tertiary polyalkanolmonoamine, the alkanol radicals of the said polyalkanolmonoamine being $C_1$–$C_6$ radicals, the alkylene oxide units being $C_2$–$C_4$ units and the statistical mean of the number of alkylene oxide units per hydroxyl functional group of the polyalkanolmonoamine being between 1 and 10 inclusive, the polyol P2 in this case not comprising monoethylene glycol, or at least one polyoxyalkylenated polyalkanolpolyamine having at least one tertiary amine functional group, the alkanol radicals of the said polyalkanolpolyamine being $C_1$–$C_6$ radicals, the alkylene oxide units being $C_2$–$C_4$ units and the statistical mean of the number N of alkylene oxide units per polyalkanolpolyamine molecule being equal to f<x, f being the number of hydroxyl functional groups per polyalkanolamine molecule and x being a number between 1 and 10 inclusive; in this case, preferably all the amine functional groups of the polyamine are tertiary.

The alkanol radical of the polyalkanolamine(s) is preferably a $C_2$–$C_3$ radical and the alkylene oxide unit is taken from the group formed by ethylene oxide, propylene oxide and their mixtures.

The molar ratio of the polyoxyalkylenated polyalkanolamine to all the other polyols used for the reaction with the acid reactant A is advantageously between 1/99 and 50/50, preferably between 3/97 and 10/90 (proportions in moles).

When the polyalkanolamine is a polyalkanolmonoamine, the polyol P2 advantageously comprises at least one glycol chosen from the group formed by diethylene glycol and polyethylene glycols with an order greater than 2.

When the polyalkanolamine is a polyalkanolpolyamine, the polyol P2 advantageously comprises at least one glycol taken from group formed by monoethylene glycol, diethylene glycol and polyethylene glycols with an order greater than 2.

In all cases, the polyol P2 can also comprise at least one branched glycol of formula:

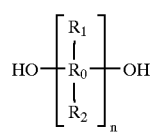

in which formula:

$R_0$ represents, independently in each [$R_1R_0R_2$] unit, a carbon atom, a $C_6$ alicyclic radical, a phenyl radical or a heterocyclic radical comprising 4 to 6 atoms which is saturated or unsaturated, the heteroatom being O or N;

$R_1$ and $R_2$ represent, independently in each [$R_1R_0R_2$] unit and independently of one another, a hydrogen atom, a linear $C_1$–$C_6$ alkyl radical, a branched $C_3$–$C_6$ radical, a $C_6$ alicyclic radical or an aryl radical;

with the proviso that, if $R_0$ is not a ring in any of the [$R_1R_0R_2$] units, $R_1$ and/or $R_2$ is (are) different from H in at least one of the [$R_1R_0R_2$] units;

n is an integer between 1 and 8 (inclusive), with the proviso that, if n is greater than or equal to 4, the number of the carbon atoms in the combined $R_0$, $R_1$ and $R_2$ radicals is greater than 8 in total.

The polyol P3 is preferably composed entirely of one or more polyoxyalkylenated polyalkanolamine(s) However, the polyol P3 can also comprise at least one polyoxyalkylenated polyalkanol obtained by oxyalkylenation from a hydroxylated component, such as trimethylolethane, trimethylolpropane, ditrimethylol-propane, pentaerythritol, dipentaerythritol, glycerol, hexane-1,2,6-triol, butane-1,2,4-triol, sorbitol, tris(2-hydroxyethyl) isocyanurate and their mixtures, the number of alkylene oxide units per hydroxyl functional group in the molecule being, as a statistical mean, between 1 and 10 inclusive. The polyol P3 can also comprise a non-oxyalkylenated polyol, such as trimethylolethane, trimethylolpropane, ditrimethylolpropane, pentaerythritol, dipenta-erythritol, glycerol, hexane-1,2,6-triol, butane-1,2, 4-triol, sorbitol, tris(2-hydroxyethyl) isocyanurate and their mixtures.

The acid reactant A advantageously comprises at least:

one aliphatic or aromatic diacid preferably taken from the group formed by adipic acid and phthalic anhydride, and/or one branched acid having a functionality greater than or equal to 2, which branched acid is preferably a dimer of an unsaturated $C_{12}$–$C_{24}$ fatty acid.

Another subject matter of the invention is the polyurethane foams obtained by the process defined above. These polyurethane foams can be used in all their known uses. Mention may be made of heir use in the furniture industry, for the manufacture of mattresses, cushions and coverings, for the manufacture of cushions and armrests in vehicles, and as absorbent for mineral oils. When they are rigid, they can be used as thermal and sound insulators in buildings, as shockproofing in packages, as filters and; for their buoyancy, in shipbuilding. More particularly, a subject matter of the invention is the use of these foams for the production of components intended to equip the passenger compartment of a motor vehicle.

Several examples of the implementation of the process according to the invention will be given below, purely by way of illustration and without limitation.

EXAMPLES a) Preparation of Ethoxylated Triethanolamines (TEA)

Triethanolamine and an aqueous potassium hydroxide solution are introduced into a 6 liter reactor in the proportions given in Table I below. The atmosphere and the contents of the reactor are dehydrated under a nitrogen atmosphere at 140° C. The reactor is closed and ethylene oxide is gradually introduced while maintaining the temperature at 150–160° C. and the pressure of the reactor at at most $3 \times 10^5$ Pa. The amount of ethylene oxide is given in Table I according to whether a triethanolamine comprising on average N=3, 6, 9 or 12 mol of ethylene oxide, denoted respectively by TEA 3 AO, TEA 6 AO, TEA 9 AO or TEA 12 AO, is desired. The reaction mixture is kept heated for 30 minutes and then cooled before opening the reactor.

TABLE I

|  | TEA 3 AO | TEA 6 AO | TEA 9 AO | TEA 12 AO |
|---|---|---|---|---|
| TEA, g | 2120 | 1450 | 1090 | 880 |
| KOH (50%), g | 4 | 4 | 4 | 4 |
| Ethylene oxide, g | 1880 | 2560 | 2900 | 4000 |
| OHN (mg KOH/g) | 611 | 425 | 320 | 243 |

OHN = hydroxyl number

Trimethylolpropane ethoxylated with 12 mol of ethylene oxide (TMP 12 AO) and glycerol ethoxylated with 12 mol of ethylene oxide (GLY 12 AO) are prepared analogously.

b) Preparation of Polyesterpolyols

Adipic acid and the polyols are introduced, into an esterification reactor equipped with a fractionating column, in the molar proportions given in Table II, such that the finished product has a hydroxyl number (OHN) equal to 60±2 mg of KOH/g and an acid number (AN)<2 mg of KOH/g. The mixture is heated to 220–230° C. under a nitrogen atmosphere in the presence of 40 ppm of a tin-derived catalysts such as "Fomrez SUL llA", manufactured by "Witco Corporation". After selective distillation of the water formed, the reaction is continued until the OHN and AN values defined in Table II are obtained.

c) Preparation of the Foams

One of the polyesters A to M in Table II is mixed manually using a rotary stirrer with 80/20 toluylene diisocyanate (TDI), which is a mixture of 2,4-TDI and 2,6-TDI in an 80/20 ratio. The amount of polyisocyanate employed is stoichiometric with respect to all the ingredients capable of reacting with the isocyanate functional group (index 100).

The mixture comprises water and a surfactant: "Niax silicon surfactant SE 232 or L 534", sold by the company "Witco Corporation".

The various formulations per 100 parts by weight of polyester necessary in order to obtain a foam with a density equal to approximately 30 kg/m$^3$ are given in Table III below.

In the case of the polyester A, two tests were carried out:

- one (A1) in the presence of two tertiary amines conventionally used as catalyst: N-ethylmorpholine (NEM) and hexadecyldimethylamine (HDDMA), and the other (A2) in the absence of catalyst.

With the polyester H, a formulation with another conventional amine catalyst: DB=dimethylbenzylamine (Test H1), and a noncatalyzed formulation (Test H2) are also given.

Tests B, C1, D, E1, F1, G, I, J and K were carried out without addition of separate tertiary amine catalysts. In Tests

TABLE II

|  | A | B | C | D | E | F | G | H | I | J | K | L | M |
|---|---|---|---|---|---|---|---|---|---|---|---|---|---|
| MEG[1] |  |  |  |  |  |  |  | 60 | 60 |  | 57 | 64 | 62 |
| DEG[2] | 94 | 94 | 93.5 | 93.5 | 93.5 | 94 | 94 |  |  | 89 |  |  |  |
| MPG[3] |  |  |  |  |  |  |  | 35 | 34.5 |  | 33 | 30 | 30 |
| TMP[4] | 6 |  |  |  |  |  |  |  |  |  |  |  | 4 |
| TEA[5] |  | 6 |  |  |  |  |  |  |  | 5 |  |  |  |
| PE[6] |  |  |  |  |  |  |  |  |  |  |  | 2 |  |
| TEA 3 EO |  |  | 6.5 |  |  |  |  |  |  |  |  |  |  |
| TEA 6 EO |  |  |  | 6.5 |  |  |  |  |  |  |  |  |  |
| TEA 9 EO |  |  |  |  | 6.5 |  |  |  |  |  | 6 | 6 | 4 | 4 |
| TEA 12 EO |  |  |  |  |  | 6 | 6[7] |  | 5.5 |  |  |  |  |
| TMP 12 EO |  |  |  |  |  |  |  | 5 |  |  |  |  |  |
| GLY 12 EO |  |  |  |  |  |  |  |  |  |  | 4 |  |  |
| OHN, mg KOH/g | 60 | 59.4 | 58.5 | 58.8 | 62 | 62 | 60.6 | 60 | 62 | 59 | 61.9 | 61 | 60.5 |
| AN, mg KOH/g | 1.5 | 0.6 | 1.4 | 1.8 | 1.2 | 1.3 | 1.3 | 1.3 | 0.9 | 0.9 | 0.9 | 1 | 1.1 |

[1] Monoethylene glycol
[2] Diethylene glycol
[3] Monopropylene glycol
[4] Trimethylolpropane
[5] Triethanolamine
[6] Pentaerythritol
[7] Demineralized In this table, the product A is a polyadipate sold by Witco Corporation under the name "Fomrez 60 LV", which is prepared without use of ethoxylated polyalkanolamine; the product B is prepared from nonethoxylated triethanolamine. The ethoxylated triethanolamine comprising a small amount of potassium without removal at the end was used for all the products C, D, E, F, I, J, K, L and M; for the product G, the potassium was removed by addition of 2% of magnesium silicate (sold by Hoechst under the name "Ambosol C"), stirring for 2 hours at 100–110° C. with nitrogen at the surface and then filtering through paper.

C2, E2, F2, L and M1, an organometallic catalyst, stannous octoate, was added. In Test M2, a small amount of tertiary amine was introduced.

The cream time (time necessary for the beginning of the foaming) and the rise time (time necessary in order to obtain the end of the foaming) were measured. The stability of the foam was also evaluated by assessing the collapse at the end of rise. The quality of the foam was also evaluated after maturing for 30 min at 90–100° C., followed by 24 hours at 23–25° C. The visual appearance is given, as well as the number of cells per cm when the foam is satisfactory.

TABLE III

| Formulation | A1 | A2 | B | C1 | C2 | D | E1 | E2 | F1 | F2 |
|---|---|---|---|---|---|---|---|---|---|---|
| Water | 3.8 | 3.8 | 3.8 | 3.8 | 3.8 | 3.8 | 3.8 | 3.8 | 3.8 | 3.8 |
| Niax SE 232 | 1 | 1 | 1 | 1 | 1 | 1 | 1 | 1 | 1 | 1 |
| Niax L 534 | — | — | — | — | — | — | — | — | — | — |
| NEM | 1.8 | — | — | — | — | — | — | — | — | — |
| HDDMA | 0.1 | — | — | — | — | — | — | — | — | — |
| DB$^{(1)}$ | — | — | — | — | — | — | — | — | — | — |
| Stannous octoate | — | — | — | — | 0.05 | — | — | 0.05 | — | 0.05 |
| Cream time, s | 12 | 240 | 85 | 20 | 16 | 18 | 15 | 15 | 15 | 12 |
| Rise time, s Collapse at the end | 83 | >>300 | >300 | 125 | 120 | 100 | 96 | 87 | 98 | 90 |
| Appearance of the foam | none | total | very high | high | slight cracked | slight cracked | slight cracked | none | slight cracked | none |
| Number of cells/cm | good | na* | na* | hollow | — | — | — | good | — | good |
| Amine smell | 20–22 strong | none | none | none | none | none | none | 20–22 none | none | 20–22 none |

| Formulation | G | H1 | H2 | I | J | K | L | M1 | M2 |
|---|---|---|---|---|---|---|---|---|---|
| Water | 3.8 | 3.8 | 3.8 | 3.8 | 3.8 | 3.8 | 3.8 | 3.8 | 3.8 |
| Niax SE 232 | 1 | — | — | 1 | 1 | 1 | — | — | — |
| Niax L 534 | — | 1 | 1 | — | — | — | 1 | 1 | 1 |
| NEM | — | — | — | — | — | — | — | — | — |
| HDDMA | — | — | — | — | — | — | — | — | — |
| DB$^{(1)}$ | — | 1.3 | — | — | — | — | — | — | 0.6 |
| Stannous octoate | — | — | — | — | — | — | 0.05 | 0.05 | — |
| Cream time, s | 15 | 16 | 200 | 17 | 14 | 15 | 20 | 20 | 16 |
| Rise time, s Collapse at the end | 95 | 78 | >>300 | 112 | 95 | 113 | 110 | 115 | 85 |
| Appearance of the foam | slight cracked | none | total | slight cracked | none | none | none | none | none |
| Number of cells/cm | — | good | na* | — | good | good | good | good | good |
| Amine smell | none | 20–22 strong | none | none | 20–22 none | 20–22 none | 20–22 none | 20–22 none | 20–22 slight |

$^{(1)}$Dimethylbenzylamine
*not applicable: there is collapse of the foam

These tests show that the polyesterpolyols C, D, E, F, G, I, J, K, L and M which comprise polyethoxylated triethanolamine make it possible to obtain, without it being necessary to add a separate tertiary amine catalyst, foams having a reactivity similar to that of the standard formulation A1 in which a separate catalyst composed of two tertiary amines was used. Furthermore, the foams obtained do not have an amine smell perceptible to the nose.

The tests carried out with the polyesterpolyols J and K show that it is possible to do without amine catalyst. Comparison of Tests C1 and C2, E1 and E2, and F1 and F2 show [sic] that when the gelling reaction is not sufficiently catalyzed, addition of a small amount of organometallic catalyst, which has the advantage of not introducing free amine, makes it possible to obtain a foam which does not collapse. Tests, L and M1 confirm this behavior. Test M2 shows that it is optionally possible to obtain a good foam by using a tertiary amine but in a markedly lower amount than in a conventional formulation (Tests A1 and H1).

Comparison of the foams obtained with the polyesterpolyols F1 and G shows that the potassium is not the cause of the observed catalytic effect.

Test B shows that the catalytic effect according to the invention is not produced when the polyesterpolyol incorporates only a nonethoxylated triethanolamine.

Tests A2 and H2 show that the catalytic effect according to the invention is not produced when no catalyst is employed at the time of mixing and when a polyesterpolyol obtained without incorporation of ethoxylated triethanolamine is used.

We claim:

1. Process for the manufacture of a polyurethane foam by reaction of at least one polyesterpolyol and of at least one polyisocyanate in the presence of a foaming agent and of a catalyzing agent, such a polyesterpolyol having been obtained beforehand by reaction of an acid reactant A, comprising at least one aliphatic or aromatic polyacid with a fuctionality at least equal to 2, with at least one polyol P2 with a functionality equal to 2 and at least one polyol P3 with a functionality at leas equal to 3 and subsequently being denoted by AP2P3, characterized in that the catalyzing agent is at least partially composed of at least one amine polyesterpolyol AP2P3, in which at least a portion of the polyol P3 is composed of at least one polyoxyalkylenated polyalkanolamine having at least one tertiary amine fuctional group, the alkanol radicals of the said polyalkanolamine being $C_1$–$C_6$ radicals, the alkylene oxide units being $C_2$–$C_4$ units and the statistical mean of the number N of alkylene oxide units per polyoxyalkylated polyalkanolamine molecule being equal to fxx, f being the number of hydroxyl functional groups per polyalkanolamine molecule and x being a number between 1 and 10 inclusive.

2. Process according to claim 1, characterized in that the foaming agent is water.

3. Process according to claim 2, characterized in that the amine polyesterpolyol(s) AP2P3 is (are) the only amine catalyst(s) of the catalyst agent.

4. Process according to either of claims 2 and 3, characterized in that the catalyst agent comprises, in addition to the amine polyesterpolyol(s) AP2P3, at least one catalyst of organometallic type.

5. Process according to claim 1, characterized in that the polyalkanolamine at least partially constituting the polyol P3 is a polyamine.

6. Process according to claim 5, characterized in that all the amine functional groups of the polyamine are tertiary.

7. Process according to claim 1, characterized in that the polyalkanolamine at least partially constituting the polyol P3 is a tertiary monoamine.

8. Process according to claim 1, characterized in that the alkanol radicals of the polyalkanolamine(s) are $C_2$–$C_3$ radicals and the alkylene oxide units are taken from the group formed by ethylene oxide, propylene oxide and their mixtures, x being a number between 2 and 5 inclusive.

9. Process according to claim 1, characterized in that, in the amine polyesterpolyol AP2P3, the molar ratio of the polyoxyalkylenated polyalkanolamine(s) to all the other polyols used for the reaction with the acid reactant A is between 1/99 and 50/50.

10. Process according to claim 1, characterized in that the polyol P2 comprises at least one glycol chosen from the group formed by monoethylene glycol, diethylene glycol and polyethylene glycols with an order greater than 2.

11. Process according to claim 1, characterized in that the polyol P2 comprises at least one branched glycol of fomula:

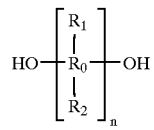

in which formula:
$R_0$ represents, independently in each $|R_1R_0R_2|$ unit, a carbon atom, a $C_6$ alicyclic radical, a phenyl radical or a heterocylcic radical comprising 4 to 6 atoms which is saturated or unsaturated, the heteroatom being O or N;

$R_1$ and $R_2$ represent, independently in each $|R_1R_0R_2|$ unit and independently of one another, a hydrogen atom, a linear $C_1$–$C_6$ alkyl radical, a branched $C_3$–$C_6$ radical, a $C_6$ alicyclic radical or an aryl radical;

with the proviso that, if $R_0$ is not a ring in any of the $|R_1R_0R_2|$ units, $R_1$ and/or $R_2$ is (are) different from H in atleast one of the $|R_1R_0R_2|$ units;

n is an integer between 1 and 8 (inclusive), with the proviso that, if n is greater than or equal to 4, the number of the carbon atoms in the combined $R_0$, $R_1$ and $R_2$ radicals is greater than 8 in total.

12. Process according to claim 1, characterized in that the polyol P3 is composed entirely of one or more polyoxyalkylenated polyalkanolamine(s).

13. Process according to claim 1, characterized in that the polyol P3 comprises at least one polyoxyalkylenated polyalkanol obtained by oxyalkylenation from a hydroxylated component taken from the group formed by trimethylolethane, trimethylolpropane, ditrimethylolpropane, pentaerythritol, dipentaerythritol, glycerol, hexane-1,2,6-triol, butane-1,2,4-triol, sorbitol, tris (2-hydroxyethyl) isocyanurate and their mixtures, the number of alkylene oxide units per polyoxyalkylenated polyalkanol molecule being, per hydroxyl group, as a statistical mean, between 1 and 10 inclusive.

14. Process according to claim 1, characterized in that the acid reactant A comprises at least one diacid taken from the group formed by adipic acid and phthalic anhydride.

15. Process according to claim 1, characterized in that the acid reactant A comprises at least one branched acid having a functionality greater than or equal to 2.

16. Process according to claim 15, characterized in that the branched acid is a dimer of an unsaturated $C_{12}$–$C_{24}$ fatty acid.

17. Amine polyesterpolyol being obtained by reaction of an acid reactant A, comprising at least one aliphatic or aromatic polyacid with a functionality at least equal to 2, with at least one polyol P2 with a functionality equal to 2 and at least one polyol P3 with a functionality at least equal to 3, characterized in that at least a portion of the polyol P3 is composed of at least one polyoxyalkylenated tertiary polyalkanolmonoamine, the alkanol radicals of the said polyalkanolmonoamine being $C_1$–$C_6$ radicals, the alkylene oxide units being $C_2$–$C_4$ units and the statistical mean of the number of alkylene oxide units per hydroxyl functional group of the polyalkanolmonoamine molecule being between 1 and 10 inclusive, the polyol P2 not comprising monoethylene glycol.

18. Amine polyesterpolyol being obtained by reaction of an acid reactant A, comprising at least one aliphatic or aromatic polyacid with a functionality at least equal to 2, with at least one polyol P2 with a functionality equal to 2 and at least one polyol P3 with a functionality at least equal to 3, characterized in that at least a portion of the polyol P3 is composed of at least one polyoxyalkylenated polyalkanolamine having at least one tertiary amine functional group, the alkanol radicals of the said polyalkanolpolyamine being $C_1$–$C_6$ radicals, the alkylene oxide units being $C_2$–$C_4$ units and the statistical mean of the number N of alkylene oxide units per polyalkanolpolyamine molecule being equal to f×x, f being the number of hydroxyl functional groups per polyalkanolamine molecule and x being a number between 1 and 10 inclusive.

19. Amine polyesterpolyol according to claim 18, characterized in that all the amine functional groups of the polyamine are tertiary.

20. Amine polyesterpolyol according to one of claims 17 to 19, characterized in that the alkanol radical of the polyalkanolamine(s) os a $C_2$–$C_3$ radical and the alkylene oxide unit is taken from the group formed by ethylene oxide, propylene oxide and their mixtures.

21. Amine polyesterpolyol according to one of claims 17 to 19, characterized in that the molar ratio of the polyoxyalkylenated polyalkanolamine to all the other polyols used for the reaction with the acid reactant A is between 1/99 and 50/50.

22. Amine polyesterpolyol according to claim 17, characterized in that the polyol P2 comprises at least one glycol chosen from the group formed by diethylene glycol and polyethylene glycols with an order greater than 2.

23. Amine polyesterpolyol according to claim 18, characterized in that the polyol P2 comprises at least one glycol taken from the group formed by monoethylene glycol, diethylene glycol and polyethylene glycols with an order greater than 2.

24. Amine polyesterpolyol according to one of claims 17 to 19, characterized in that the polyol P2 comprises at least one branched glycol of formula:

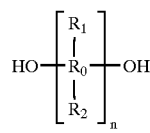

in which formula:

R₀ represents, independently in each |R₁R₀R₂| unit, a carbon atom, a $C_6$ alicyclic radical, a phenyl radical or a heterocylcic radical comprising 4 to 6 atoms which is saturated or unsaturated, the heteroatom being O or N;

R₁ and R₂ represent, independently in each |R₁R₀R₂| unit and independently of one another, a hydrogen atom, a linear $C_1$–$C_6$ alkyl radical, a branched $C_3$–$C_6$ radical, a $C_6$ alicyclic radical or an aryl radical;

with the proviso that, if R₀ is not a ring in any of the |R₁R₀R₂| units, R₁ and/or R₂ is (are) different from H in at least one of the |R₁R₀R₂| units;

n is an integer between 1 and 8 (inclusive), with the proviso that, if n is greater than or equal to 4, the number of the carbon atoms in the combined R₀, R₁ and R₂ radicals is greater than 8 in total.

25. Amine polyesterpolyol according to one of claims 17 to 19, characterized in that the polyol P3 is composed entirely of one or more polyalkanolamine(s).

26. Amine polyesterpolyol according to one of claims 17 to 19, characterized in that the polyol P3 comprises at least one polyoxyalkylenated polyalkanol obtained by oxyalkylenation from a hydroxylated component taken from the group formed by trimethylolethane, trimethylolpropane, ditrimethylolpropane, pentaerythritol, dipentaerythritol, glycerol, hexane-1,2,6-triol, butane-1,2,4-triol, sorbitol, tris (2-hydroxyethyl) isocyanurate and their mixtures, the number of alkylene oxide units per hydroxyl functional group being, as a statistical mean, between 1 and 10 inclusive.

27. Amine polyesterpolyol according to one of claims 17 to 19, characterized in that the acid reactant A comprises at least one diacid taken from the group formed by adipic acid and phthalic anhydride.

28. Amine polyesterpolyol according to one of claims 17 to 19, characterized in that the acid reactant A comprises at least one branched acid having a functionality greater than or equal to 2.

29. Amine polyesterpolyol according to claim 28, characterized in that the branched acid is a dimer of an unsaturated $C_{12}$–$C_{24}$ fatty acid.

30. Polyurethane foam obtained by the process according to claim 1.

* * * * *